(12) United States Patent
Guo et al.

(10) Patent No.: US 10,185,983 B2
(45) Date of Patent: Jan. 22, 2019

(54) LEAST-ASK: CONVERSATIONAL RECOMMENDER SYSTEM WITH MINIMIZED USER INTERACTION

(71) Applicant: TCL RESEARCH AMERICA INC., San Jose, CA (US)

(72) Inventors: Lifan Guo, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 394 days.

(21) Appl. No.: 14/985,608

(22) Filed: Dec. 31, 2015

(65) Prior Publication Data
US 2017/0193585 A1   Jul. 6, 2017

(51) Int. Cl.
  *G06Q 30/00* (2012.01)
  *G06Q 30/06* (2012.01)
  *G06F 17/30* (2006.01)

(52) U.S. Cl.
  CPC ... *G06Q 30/0631* (2013.01); *G06F 17/30867* (2013.01)

(58) Field of Classification Search
  CPC .................................................. G06Q 30/06
  USPC ........................................................ 705/26.1
  See application file for complete search history.

(56) References Cited

U.S. PATENT DOCUMENTS

| | | | |
|---|---|---|---|
| 2006/0047643 A1* | 3/2006 | Chaman | G06F 17/30867 |
| 2006/0112087 A1* | 5/2006 | Smyth | G06F 17/30876 |
| 2011/0010366 A1* | 1/2011 | Varshavsky | G06F 17/30864 707/732 |
| 2012/0226651 A1* | 9/2012 | Chidlovskii | G06Q 10/10 706/52 |
| 2014/0280289 A1* | 9/2014 | Marantz | G06F 17/30392 707/767 |
| 2017/0169500 A1* | 6/2017 | Merz | G06F 7/08 |

* cited by examiner

*Primary Examiner* — Mila Airapetian
(74) *Attorney, Agent, or Firm* — Anova Law Group, PLLC

(57) ABSTRACT

A method for a conversational recommender system includes receiving at least one user preference from a user, generating an abstract explanation reflecting the at least one user preference and based on the abstract explanation, and retrieving a list of items to be evaluated by the user from an item database. The items on the list have a relevance with the user preference. The method further includes determining an initial ranking order of the items to be evaluated by the user, and ranking the items to be evaluated by the user based on a random walk algorithm and the initial ranking order. Items not ranked are remaining items. The method further includes receiving a user feedback of the ranked item, and re-ranking the remaining items based on the user feedback of the ranked items and the random walk algorithm.

16 Claims, 5 Drawing Sheets

LEAST-ASK: CONVERSATIONAL RECOMMENDER SYSTEM WITH MINIMIZED USER INTERACTION

FIELD OF THE INVENTION

The present invention relates generally to the field of computer technologies and, more particularly, to conversational recommender systems with minimized user interaction.

BACKGROUND

It is usually difficult for most customers to specify their requirements when purchasing products or receiving services. A more natural way to identify the customers' requirements is to ask what they really want. Thus, a recommender system, which can assist a user to get a product meeting his/her requirements, is highly desired. However, in practical applications, user experience is ruined by the fact that the recommendation system usually takes a long time to generate a recommendation meeting the users' requirements, because most users are usually not satisfied with an initial recommendation.

This issue has been solved by a Conversational Recommender System (CRS), which allows repeated interactions between the user and the CRS to obtain the right products. One main strategy adopted in the CRSs is to collect the user's requirements, i.e., navigation-by-asking. However, theoretically speaking, it would take an infinite time to navigate the user to all products, thus navigation-by-asking is not practical.

Further, many CRSs adopt a concept of the top k (e.g. top 10) items based on an estimation of the user's preferences. That is, the k highest rated items are presented either as a current recommendation or a potential recommendation. However, the CRSs only provide limited choices to the user, because these recommended products may be similar to each other and far away from an optimal product meeting the user's requirements.

To overcome this issue, some CRSs define a diverse range of preferences. Diversity-oriented CRSs are generally motivated to overcome an imprecision in a preference assessment, but unfortunately fail to quantitatively evaluate the user experience. Intuitively, an ideal CRS is desired to perform like an excellent salesperson, who could focus on the user's feedback and then proactively adjusts his/her selling strategy according to the user's feedback.

The disclosed methods and systems are directed to solve one or more problems set forth above and other problems.

BRIEF SUMMARY OF THE DISCLOSURE

One aspect of the present disclosure includes a method for a conversational recommender system. The method includes receiving at least one user preference from a user, generating an abstract explanation reflecting the at least one user preference and based on the abstract explanation, and retrieving a list of items to be evaluated by the user from an item database. The items on the list have a relevance with the user preference. The method further includes determining an initial ranking order of the items to be evaluated by the user, and ranking the items to be evaluated by the user based on a random walk algorithm and the initial ranking order. Items not ranked are remaining items. The method further includes receiving a user feedback of the ranked item, and re-ranking the remaining items based on the user feedback of the ranked items and the random walk algorithm.

Another aspect of the present disclosure includes non-transitory computer-readable medium having computer program for, when being executed by a processor, performing a content retrieval method. The method includes receiving at least one user preference from a user, generating an abstract explanation reflecting the at least one user preference and based on the abstract explanation, and retrieving a list of items to be evaluated by the user from an item database. The items on the list have a relevance with the user preference. The method further includes determining an initial ranking order of the items to be evaluated by the user, and ranking the items to be evaluated by the user based on a random walk algorithm and the initial ranking order. Items not ranked are remaining items. The method further includes receiving a user feedback of the ranked item, and re-ranking the remaining items based on the user feedback of the ranked items and the random walk algorithm.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

A conventional CRS has been trying to decrease the times of interactions between the user and the CRS, because user experience may be degraded if the interaction between the user and the CRS is repeated too frequently. However, the conventional CRS still fails to quantitatively evaluate the user experience. To better evaluate the user experience, a quantitative evaluation of the user experience is highly desired. The present invention provides a quantitative value which may evaluate the user experience in the CRS, i.e., the number of questions the CRS asks to satisfy the user.

To further improve the user experience, the concept of Least-Ask is introduced in the present invention. Least-Ask is a mechanism (e.g. an application program) built into a CRS consistent with disclosed embodiments, aiming to minimize the quantitative value, i.e., minimize the number of questions the CRS asks to satisfy the user. The present invention provides a CRS based on the concept of Least-Ask, which may simultaneously model the user preference and user feedback to minimize the number of questions the CRS asks to satisfy the user.

Figure 1:
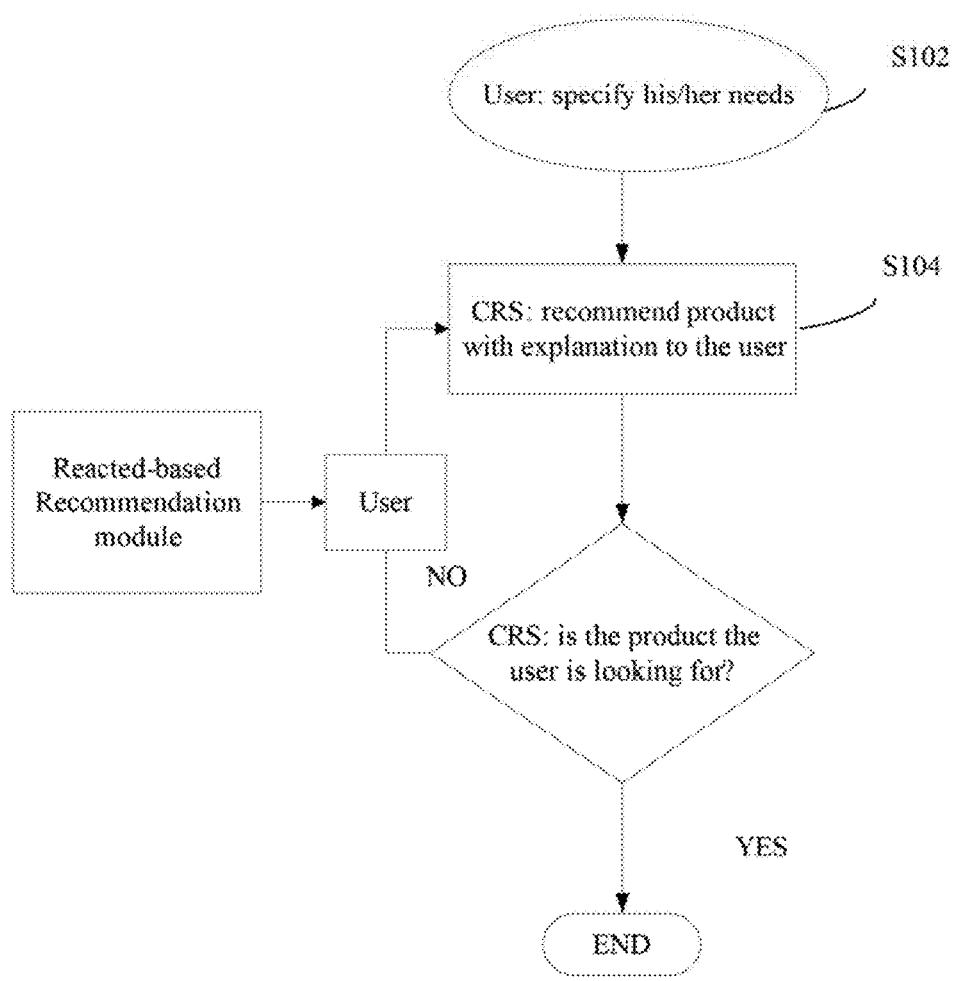
FIG. 1 illustrates a flow chart of an exemplary process performed by an exemplary Conversational Recommender System (CRS) consistent with disclosed embodiments.

FIG. 1 illustrates a flow chart of an exemplary process performed by an exemplary Conversational Recommender System (CRS) consistent with disclosed embodiments. As shown in FIG. 1, after a user specifies his/her needs to the CRS (S102), and then the CRS may generate a list of products and recommend the $1^{st}$ ranked product on the list with an explanation of the first product to the user (S104). If the user is satisfied with the recommendation, the process ends. If the user is not satisfied with the recommendation, given a user feedback, a reacted-based recommendation module may adjust strategy to re-rank remaining products until the user is satisfied by the product recommended to him/her (S106).

Figure 2:
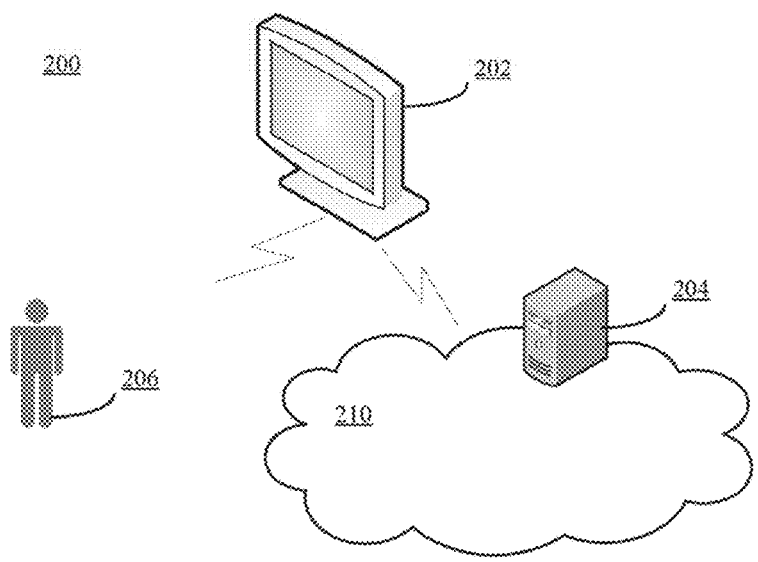
FIG. 2 illustrates an exemplary environment incorporating certain embodiments of the present invention.

FIG. 2 illustrates an exemplary environment 200 incorporating certain embodiments of the present invention. As shown in FIG. 2, environment 200 includes a user terminal 202, a server 204, a user 206, and a network 210. Other devices may also be included.

The user terminal 202 may include any appropriate type of electronic device with computing capabilities, such as a television (TV), a set top box, a mobile phone, a smart phone, a tablet, a personal computer (PC), a server computer, a laptop computer, and a digital personal assistant (PDA), etc. Further, the user terminal 202 may be any appropriate content-presentation device capable of presenting texts, images, videos, etc.

The server 204 may include any appropriate type of server computer or a plurality of server computers for providing personalized contents to the user 206. The server 204 may also facilitate the communication, data storage, and data processing between the other servers and the user terminal 202. The user terminal 202, and server 204 may communicate with each other through one or more communication networks 210, such as cable network, phone network, and/or satellite network, etc.

The user 206 may interact with the user terminal 202 to query and to retrieve various contents and perform other activities of interest, or the user may use voice, hand or body gestures to control the user terminal 202 if speech recognition engines, motion sensor or depth-camera is used by the user terminal 202. The user 206 may be a single user or a plurality of users, such as family members.

Figure 3:
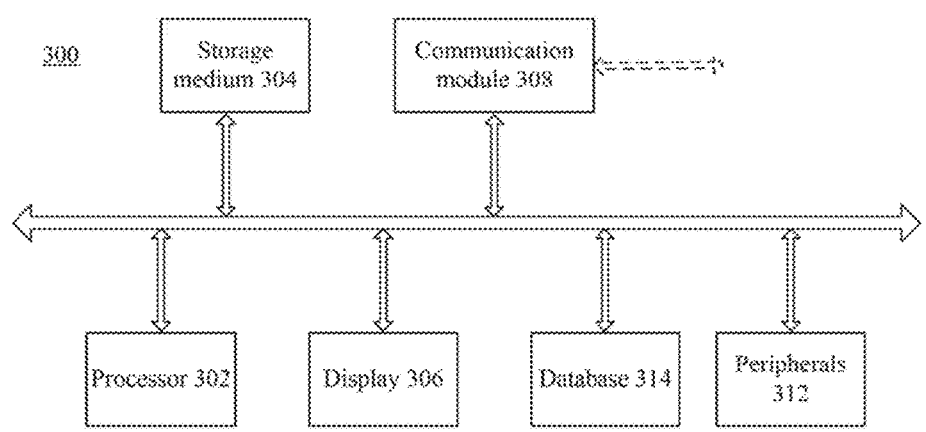
FIG. 3 illustrates an exemplary computing system consistent with disclosed embodiments.

The user terminal 202, and/or server 204 may be implemented on any appropriate computing circuitry platform. FIG. 3 shows a block diagram of an exemplary computing system capable of implementing the user terminal 202, and/or server 204

As shown in FIG. 3, the computing system 300 may include a processor 302, a storage medium 304, a display 306, a communication module 308, a database 314, and peripherals 312. Certain components may be omitted and other components may be included.

The processor 302 may include any appropriate processor or processors. Further, the processor 302 can include multiple cores for multi-thread or parallel processing. The storage medium 304 may include memory modules, such as ROM, RAM, flash memory modules, and mass storages, such as CD-ROM and hard disk, etc. The storage medium 304 may store computer programs for implementing various processes, when the computer programs are executed by the processor 302.

Further, the peripherals 312 may include various sensors and other I/O devices, such as keyboard and mouse, and the communication module 308 may include certain network interface devices for establishing connections through communication networks. The database 314 may include one or more databases for storing certain data and for performing certain operations on the stored data, such as database searching.

Figure 4:
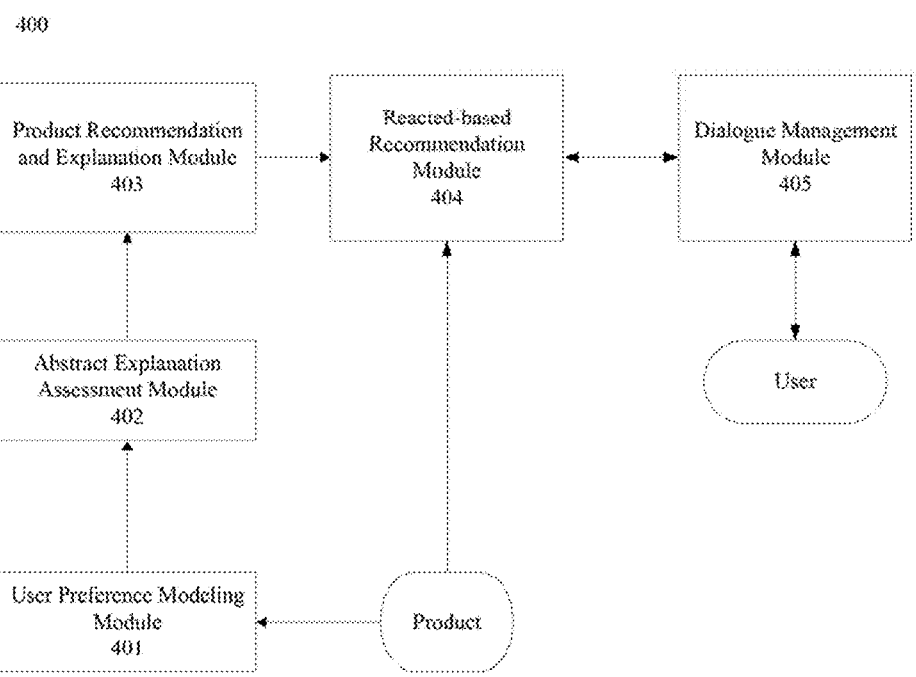
FIG. 4 illustrates a block diagram of an exemplary CRS consistent with disclosed embodiments.

The user terminal 202 and/or server 204 may implement a conversational recommender system (CRS) for the user 206. FIG. 4 illustrates a block diagram of an exemplary conversational recommender system (CRS) consistent with disclosed embodiments.

As shown in FIG. 4, the CRS 400 may include a user preference modeling module 401, an abstract explanation assessment module 402, a product recommendation and explanation module 403, a reacted-based recommendation module 404, and a dialogue management module 405. Certain components may be omitted and other components may be added. The CRS 400 (e.g., the various modules) may be implemented in hardware, software, or a combination of hardware and software.

The user preference modeling module 401 may store user information. A particular user may be represented by a unique digital data. The user information may be received from the user' inputs or automatically collected from the use's social networks. The user information may be further analyzed to understand the user's personality to address a "cold start" issue. The user preference modeling module 401 may also store user behaviors data.

Further, the user preference modeling module 401 may record the user preferences for features of a recommended product and dynamically re-build the user preferences through the interactions between the user and the CRS.

The abstract explanation assessment module 402 may allow the user to inspect the CRS's understanding of the user preferences and give feedback to infer the user' preferences. Different from other CRSs, the abstract explanation assessment module 402 in the disclosed embodiments may be able to determine a quality of any possible argument about each product feature based on the user preference.

For example, given the user's price preference is $25-$50, the abstract explanation assessment module 402 may assign an abstract explanation like, "you are currently interested in items with a price ranging $25-$50". An abstract explanation assigned by the abstract explanation assessment module 402 may be later polished by the product recommendation and explanation module 403.

The product recommendation and explanation module 403 may retrieve a list of products and generate explanations of the products. Particularly, based on predetermined algorithms, the product recommendation and explanation module 403 may retrieval products closely related to the user preference. The reacted-based recommendation module 404 may take the user feedback into consideration and re-rank the remaining products.

The dialogue management module 405 may be responsible for the interactions (e.g. conversation) between the user and the CRS. The dialogue management module 405 may further include a Natural Language Understanding (NLU) component. The input of the dialogue management module 405 may be the user's utterance, which may be converted to a specific semantic representation by the NLU component. The output of the dialogue management module 405 is a response created by the NLU component.

Figure 5:
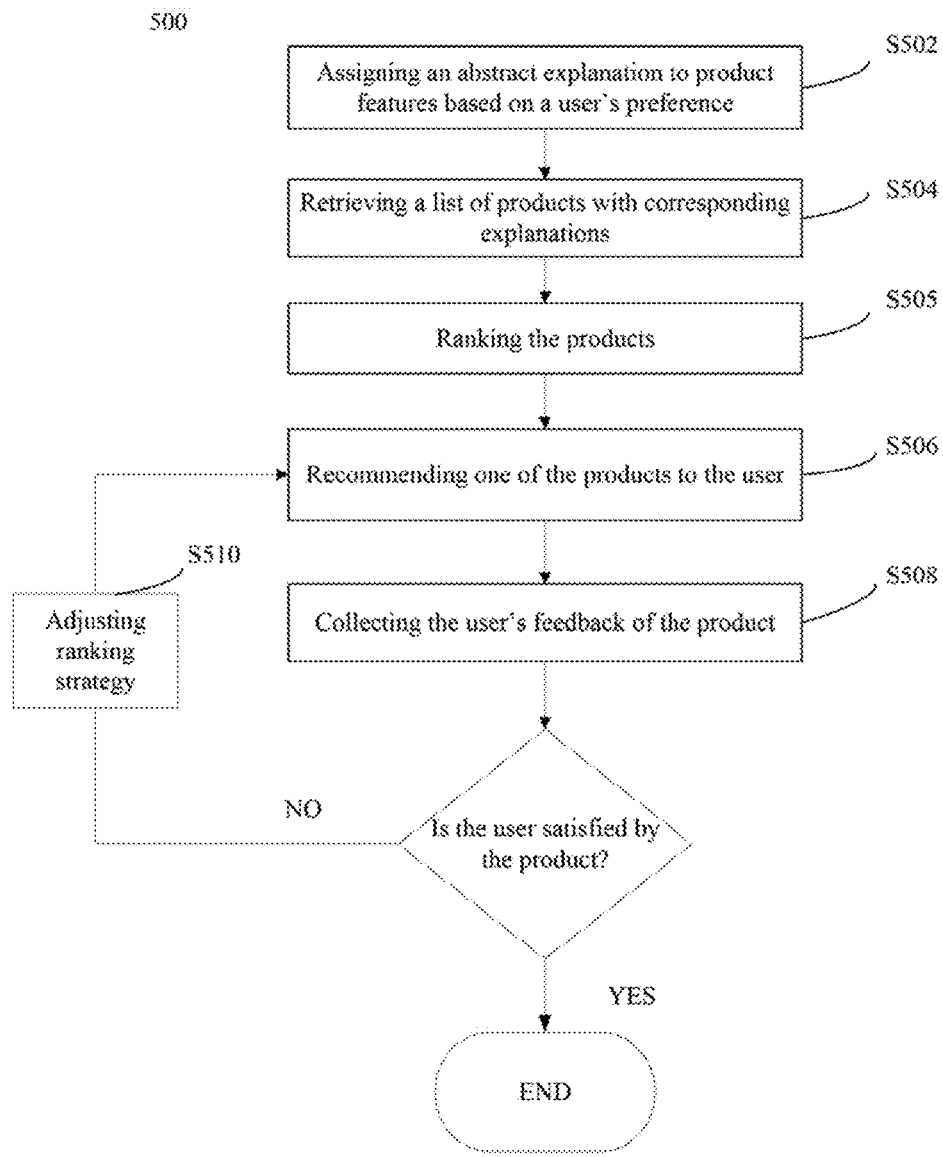
FIG. 5 illustrates an exemplary process performed by various modules in an exemplary CRS consistent with disclosed embodiments.

FIG. 5 illustrates an exemplary process 500 performed by various modules in an exemplary conversational recommender system (CRS) consistent with disclosed embodiments. As shown in FIG. 5, at the beginning, the abstract explanation assessment module assigns an abstract explanation to product features based on the user preference (S502). The product recommendation and explanation module retrieves a list of products with corresponding explanations of the products (S504).

Then the reacted-based recommendation module ranks the products (S505). Based on the ranking of the products, the reacted-based recommendation module recommends the products in order, one at a time, to the user through the dialogue management module (S506). That is, the products may be recommend starting from the highest ranking to the lowest ranking. The dialogue management collects the user feedback and returns the user feedback to the reacted-based recommendation module (S508). If the recommended product satisfies the user, the process ends.

If the recommended product does not satisfy the user, based on the user feedback, the reacted-based recommendation module adjusts the strategy to re-rank the remaining products (S510) and recommends the remaining products, one at a time, to the user through the dialogue management module. The remaining products may also be recommend based on the ranking, i.e., from the highest ranking to the lowest ranking. The process repeats until the user is satisfied with his/her choice.

For example, firstly, the $1^{st}$ ranked product is recommended to the user, who may give a feedback if he/she is not satisfied. A product similarity matrix may be refined to reflect the user feedback, and all the remaining products are re-ranked. Then the $1^{st}$ ranked product in the remaining products is recommended to the user, which is least similar to the products recommended before. That is, a product's ranking is lowered if the product is similar to the product already recommended.

The CRS 400 and the process 500 performed by various modules in the CRS 400 may be attractive to the user for several reasons. Firstly, the current recommended product is always optimal. That is, because the user feedback to the previous recommended product has been already known, minimum efforts may be required to match the user preference for the products. Secondly, from an aspect of algorithm complexity, the CRS 400 is much more efficient than the conventional "linear search" CRS.

As show in FIG. 5, the reacted-based recommendation module may recommend a product to the user by asking a question about already recommended product and receiving an answer (i.e. feedback) from the user. To satisfy the user with a minimal interaction between the user and the system, the CRS 400 provides the service based on a reacted-based strategy.

Formally, the reacted-based strategy may include two parts. The first part is a graph W, in which a plurality of nodes are connected by edges. Each node in the graph W represents a product, where $w_{ij}$ is a weight on the edge from i to j. The edge from i to j may be either directed or undirected. Directed means the edges have orientation, and undirected means the edges have no orientation. To take the user feedback into account, the second part is a sentiment analysis. That is, a sentiment score $s_i$ between 0~1 is assigned to a feedback from the user given a product.

According to the reacted-based strategy, a reacted-based algorithm is provided. The reacted-based algorithm may utilize the user feedback to re-rank the remaining products, in order to minimize the number of questions that the reacted-based recommendation module needs to ask.

In the disclosed embodiments, the reacted-based algorithm is based on a random walk in an absorbing Markov chain, assuming the user feedback could dynamically change a probability that a product satisfy his/her needs. The random walk is performed by the reacted-based recommendation module.

Figure 6:
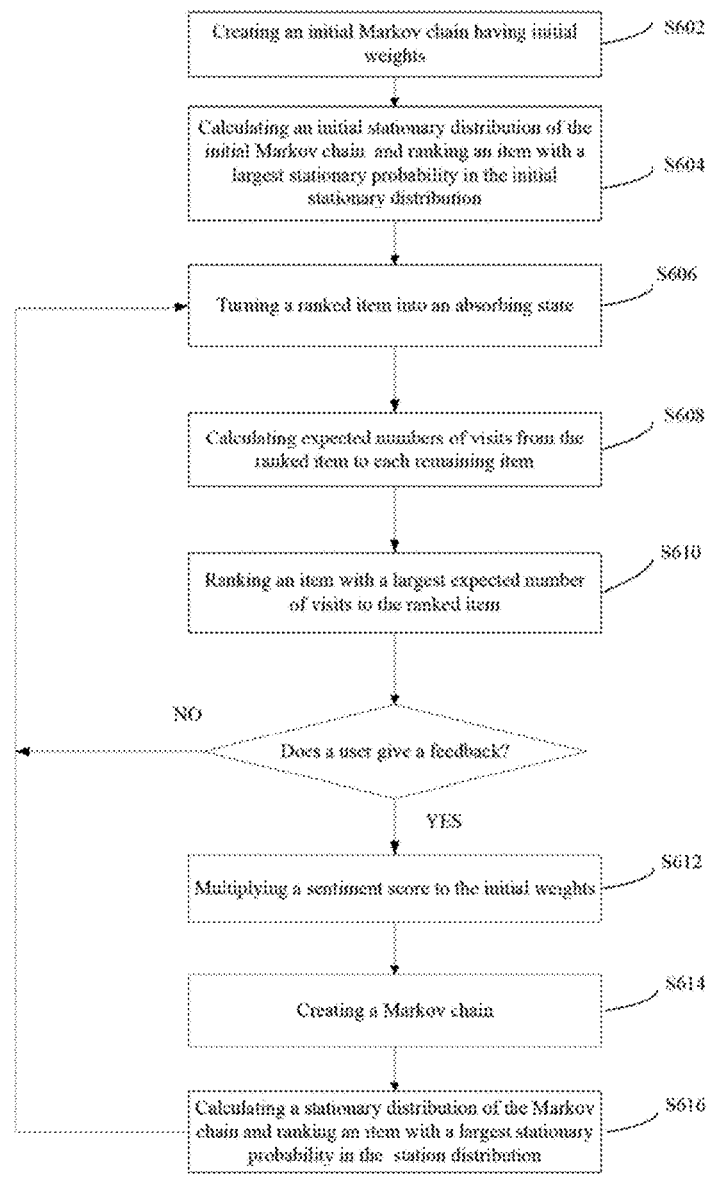
FIG. 6 illustrates a flow chart of an exemplary reacted-based algorithm consistent with disclosed embodiments.

An exemplary reacted-based algorithm consistent with disclosed embodiments is shown below. W denotes a graph, r denotes a probability distribution, $\alpha \in [0, 1]$ denotes a weight that balances the graph W and the probability distribution r, $w_i$ denotes a weight on an edge from the node $G_i$ to other nodes in the graph W, $\check{P}$ denotes a transition matrix, 1 is an all-1 vector, and $1r^T$ is the outer product. The reacted-based algorithm may generally include three steps: create an initial Markov chain, find the first item to rank and rank the remaining items. Details of the reacted-based algorithm may be explained by a flow chart. FIG. 6 illustrates a flow chart of an exemplary implementation of a reacted-based algorithm consistent with disclosed embodiments.

---

Input: w,r,α,
1. Create the initial Markov chain P from w,r,α based on
$$P = \alpha \check{P} + (1 - \alpha)1r^T$$
1. Compute P's stationary distribution π. Then picks the first one $G_1$ based on user preference.
3. Repeat until all items are ranked:
   (a) Turn remaining items into absorbing states
   (b) Compute the expected number of visits $v_i$ for all the remaining.
   (c) Multiply user's feedback $s_i$ to $w_i$
   (d) Re-calculate P and P's stationary based on stationary distribution π. Then pick the first one

---

As shown in FIG. 6, at the beginning, an initial Markov chain P is created based three inputs: a graph W, a probability distribution r, and a weight $\alpha \in [0, 1]$ that balances the graph W and the probability distribution r (S602).

Given a product list P including a number of n products, P={$p_1 \ldots p_n$}, where n is an integral equal to or larger than 1. Each $p_n$ has a feature list F={$f_{n1} \ldots f_{nm}$} and a user preference U, where m is an integral equal to or larger than 1. In a product recommender system, the product list P with n products can be denoted as an undirected but fully connected graph W with n nodes, one node for each product.

The graph W is represented by an n×n weight matrix W, where $w_{ij}$ is a weight on an edge from the node $G_i$ and the node $G_j$, i and j are integrals from 1 to n, respectively. The weight $w_{ij}$ denotes a cosine similarity between the node $G_i$ and the node $G_j$, which may be calculated based on a feature similarity between the node $G_i$ and the node $G_j$. That is, a large weight means a high similarity.

Given the product list P, an initial ranking of the product list P may be calculated. The initial ranking of the product list P may be an arbitrary ranking. In certain embodiments, the initial ranking of the product list P may be denoted as a probability distribution $r=(r_1 \ldots r_n)^T$, where $r_i \geq 0$, $\Sigma r_i = 1$. High initial rankings have high probabilities. That is, the highest-ranked product has the largest probability, the next product has a smaller probability, and so on.

Further, a n×n transition matrix $\check{P}$ of the product list P is created by normalizing rows of the weight matrix W: $\check{P}_{ij} = w_{ij}/\Sigma_{k=1}^{n}$, so that $\check{P}_{ij}$ denotes a probability that a walk moves from the node $G_i$ and the node $G_j$ at the beginning. Through interpolating each row with the probability distribution r, the initial Markov chain P can be written as:

$$P = \alpha \check{P} + (1-\alpha) 1 r^T \quad (1)$$

where 1 is an all-1 vector, and $1r^T$ is the outer product.

The next step in the reacted-based algorithm is to find the first product to rank.

According to Eq. (1), the initial Markov chain P is ergodic. Thus, an initial stationary distribution $\pi = P^T \pi$ may be calculated. The state (i.e. the product) with the largest stationary probability is selected as the first product $G_1$ in the ranking (S604). That is, $G_1 = \mathrm{argmax}_{i=1}{}^n \pi_i$.

After the first product is ranked, the next step in the reacted-based algorithm is to rank the remaining products.

It should be noted that, the stationary distribution does not address diversity at all. Because once the random walk reaches an absorbing state, the walk is absorbed and stays there. It is no longer informative to calculate the stationary distribution of an absorbing Markov chain. Thus the stationary distribution is only used to find the first product.

To introduce a diversity to the product ranking, the key is to turn the ranked products into absorbing states, i.e., turning the products which have been ranked so far into absorbing states. The absorbing states lowers the importance of similar unranked states, thus encouraging a diversity.

In the disclosed embodiments, the remaining products may be ranked according to expected number of visits before absorption. Given the node $G_i$ is the product that recommended to the user at the i iteration, $G_i$ is turned into an absorbing state (S606). The expected number of visits $v_i$ from the node $G_i$ to each node is calculated (S608). Intuitively, the nodes strongly connected to $G_i$ have many fewer visits by the random walk, because the walk tends to be absorbed soon after visiting the nodes strongly connected to $G_i$. In contrast, the nodes far away from $G_i$ still allow the random walk to linger among them, and thus have more visits.

The node with the largest expected number of visits to the node $G_i$ in the absorbing Markov chain is selected as the next product $G_{i+1}$ on the product list (S610). If the user doesn't give any feedback about the recommended products, such a process of ranking the remaining products (i.e. the steps S606, S608 and S610) may repeat until all the products are ranked or recommended.

If the user gives a feedback to CL, a sentiment score $s_i$ is assigned to $G_i$. Intuitively, a small sentimental value (i.e. a more negative feedback) decreases the possibility that the walk visits the similar nodes thus increases the possibility that the walk visits the least similar nodes. This naturally inhibits items similar to the G and obeys user's sentiments.

Based on the sentiment score $s_i$, a new weight $w_{ij}'$ between the node $G_i$ and the node $G_j$ is calculated by multiplying the sentiment score $s_i$ to the initial weight $w_{ij}$ (S612). Then a new transition matrix $\check{P}'$ and a new Markov chain P' is obtained (S614), accordingly a new stationary distribution $\pi' = P'^T \pi'$ is calculated and the state (i.e. the product) with the largest stationary probability is selected as the next product $G_{i+1}$ on the product list (S616). Then the steps S606, S608 and S610 may be repeated to rank the remaining products until the user gives another feedback.

For example, firstly, $G_1$ is turned into an absorbing state, then the expected number of visits $v_1$ from the node $G_1$ to each node is calculated. The node with the largest expected number of visits to the node $G_1$ is selected as $G_2$. Then $G_2$ is turned into an absorbing state and the expected number of visits $v_2$ from the node $G_2$ to each node is calculated. The node with the largest expected number of visits to the node $G_2$ is selected as $G_3$. If the user doesn't give any feedback about the recommended product, such a process is repeated until all the products are ranked.

If the user gives a feedback to the recommended product $G_2$, a sentiment score $s_2$ is assigned to $G_2$, and a weight $w_{2j}'$ between the product $G_2$ and the product $G_j$ is calculated by multiplying the sentiment score $s_2$ to the initial weight $w_{2j}$. Then a new stationary distribution $\pi' = P'^T \pi'$ is calculated and the state (i.e. the product) with the largest stationary probability is selected as $G_3$. If the user doesn't give any feedback to the recommended product $G_3$, $G_3$ is turned into an absorbing state, then the expected number of visits $v_3$ from the node $G_3$ to each node is calculated. The node with the largest expected number of visits to the node $G_3$ is selected as $G_4$.

Based on the reacted-based algorithm, the user feedback may be taken into account to adjust the recommendation strategy. Thus, the products diversity and the user preference may get balanced, and the user experience of the CRS may get enhanced. Particularly, when the user is not able to browse the recommendation list, the CRS consistent with the disclosed embodiments may use minimal questions to guide the user and thus decrease the time to find the desired product for the user.

It should be noted that, the concept for the conversational recommender system and methods with minimized user interaction can be extended to other tasks, such as information retrieval, image collection summarization, test summarization, social network analysis and etc. For example, in information retrieval on news events, an article is often published by multiple newspapers with only minor changes. The user may want to find an article which is different enough but also complementary. In social network analysis, people are connected by their interactions, e.g., phone calls. Active groups of people have strong interactions among them, but many groups may exist with fewer interactions. The user may want to create a list of people that represent various groups.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein

What is claimed is:

1. A method for a conversational recommender system, comprising:
    receiving at least one user preference from a user;
    generating an abstract explanation reflecting the at least one user preference;
    based on the abstract explanation, retrieving a list of items to be evaluated by the user from an item database, items on the list having a relevance with the user preference;
    determining an initial ranking order of the items to be evaluated by the user;
    ranking the items to be evaluated by the user based on a random walk algorithm and the initial ranking order, items not ranked are remaining items;
    receiving a user feedback of the ranked item;
    re-ranking the remaining items based on the user feedback of the ranked items and the random walk algorithm, wherein the random walk algorithm including:

determining a Markov chain based on a graph W representing the list of items, a probability distribution r representing the initial ranking order of the items, and a weight a balancing the graph W and the probability distribution r;

determining a stationary distribution of the Markov chain;

selecting an item with a largest stationary probability in the stationary distribution of the Markov chain as a $1^{st}$ ranked item, the items not ranked are remaining items;

ranking the remaining items based on calculating expected numbers of visits to a previous ranked item from the remaining items;

turning the previous ranked item into an absorption state;

calculating the expected numbers of visits to the previous ranked item from the remaining items; and ranking the item with a largest expected number of visits to the previous ranked item as a next item.

2. The conversational recommender system method according to claim 1, further including:

retrieving the list of items from the item database through predetermined algorithms.

3. The conversational recommender system method according to claim 1, further including:

the initial ranking order of the items to be evaluated by the user is an arbitrary ranking order.

4. The conversational recommender system method according to claim 1, wherein the random walk algorithm further including:

determining the Markov chain based on $P=\alpha \check{P}+(1-\alpha)1r^T$, where the list of the items including a number of n items $G_i$ is represented by the graph W including a number of n items $G_i$, n is an integral equal to or larger than 1, i is an integral from 1 to n, the graph W is represented by an n X n weight matrix W, the probability distribution $r=(r_1, \ldots, r_n)^T$, $r_i \geq 0$, $\Sigma r_i=1$, the weight $a \in [0, 1]$, $\check{P}$ is a n X n transition matrix $\check{P}_{ij}=w_{ij}/\Sigma_{k=1}^{n} w_{ik}$, 1 is an all-1 vector, and $1r^T$ is the outer product, $w_{ij}$ is a weight on an edge between the item $G_i$ and the item $G_j$ in the graph W, i and j are integrals from 1 to n, respectively.

5. The conversational recommender system method according to claim 4, wherein the random walk algorithm further including:

determining the stationary distribution of the Markov chain based on $\pi=P^T\pi$.

6. The conversational recommender system method according to claim 1, wherein re-ranking the remaining items based on the user feedback of the ranked items and the random walk algorithm further including:

assigning a sentiment score $s_i$ to the ranked item $G_i$; and determining a weight $W'_{ij}$ through multiplying the sentiment score $s_i$ of the ranked item $G_i$ to the weight $w_{ij}$.

7. The conversational recommender system method according to claim 6, wherein the random walk algorithm further including:

determining the Markov chain based on $P'=\alpha \check{P}'+(1-\alpha)1r^T$, $\check{P}'$ is a n X n transition matrix $\check{P}'_{ij}=w'_{ij}/\Sigma_{k=1}^{n} w'_{ik}$.

8. The conversational recommender system method according to claim 7, wherein the random walk algorithm further including:

determining the stationary distribution of the Markov chain based on $\pi'=P'^T\pi'$.

9. A non-transitory computer-readable medium having computer program for, when being executed by a processor, performing a conversational recommender system method, the method comprising:

receiving at least one user preference from a user;

generating an abstract explanation reflecting the at least one user preference;

based on the abstract explanation, retrieving a list of items to be evaluated by the user from an item database, items on the list having a relevance with the user preference;

determining an initial ranking order of the items to be evaluated by the user;

ranking the items to be evaluated by the user based on a random walk algorithm and the initial ranking order, items not ranked are remaining items;

receiving a user feedback of the ranked item;

re-ranking the remaining items based on the user feedback of the ranked items and the random walk algorithm, wherein the random walk algorithm further comprising:

determining a Markov chain based on a graph W representing the list of items, a probability distribution r representing the initial ranking order of the items, and a weight a balancing the graph W and the probability distribution r;

determining a stationary distribution of the Markov chain;

selecting an item with a largest stationary probability in the stationary distribution of the Markov chain as a $1^{st}$ ranked item, the items not ranked are remaining items;

ranking the remaining items based on calculating expected numbers of visits to a previous ranked item from the remaining items;

turning the previous ranked item into an absorption state;

calculating the expected numbers of visits to the previous ranked item from the remaining items; and ranking the item with a largest expected number of visits to the previous ranked item as a next item.

10. The non-transitory computer-readable medium according to claim 9, wherein the method further comprising:

retrieving the list of items from the item database through predetermined algorithms.

11. The non-transitory computer-readable medium according to claim 9, wherein:

the initial ranking order of the items to be evaluated by the user is an arbitrary ranking order.

12. The non-transitory computer-readable medium according to claim 9, wherein the random walk algorithm further comprising:

determining the Markov chain based on $P=\alpha \check{P}+(1-\alpha)1r^T$, where the list of the items including a number of n items $G_i$ is represented by the graph W including a number of n items $G_i$, n is an integral equal to or larger than 1, i is an integral from 1 to n, the graph W is represented by an n X n weight matrix W, the probability distribution $r=((r_1, \ldots, r_n)^T$, $r_i \geq 0$, $\Sigma r_i=1$, the weight $a \in [0, 1]$, $\check{P}$ is a n X n transition matrix $\check{P}_{ij}=w_{ij}/\Sigma_{k=1}^{n} w_{ik}$, 1 is an all-1 vector, and $1r^T$ is the outer product, $w_{ij}$ is a weight on an edge between the item $G_i$ and the item $G_j$ in the graph W, i and j are integrals from 1 to n, respectively.

13. The non-transitory computer-readable medium according to claim 12, wherein the random walk algorithm further comprising:

determining the stationary distribution of the Markov chain based on $\pi = P^T \pi$.

14. The non-transitory computer-readable medium according to claim 9, wherein re-ranking the remaining items based on the user feedback of the ranked items and the random walk algorithm further including:
  assigning a sentiment score $s_i$ to the ranked item $G_i$; and
  determining a weight $w'_{ij}$ through multiplying the sentiment score $s_i$ of the ranked item $G_i$ to the weight $w_{ij}$.

15. The non-transitory computer-readable medium according to claim 14, wherein the random walk algorithm further including:
  determining the Markov chain based on $P' = \alpha \check{P}' + (1-\alpha) 1 r^T$, $\check{P}'$ is a n X n transition matrix $\check{P}'_{ij} = w'_{ij} / \Sigma_{k=1}^{n} w'_{ik}$.

16. The non-transitory computer-readable medium according to claim 15, wherein the random walk algorithm further including:
  determining the stationary distribution of the Markov chain based on $\pi' = P'^T \pi'$.

* * * * *